United States Patent
Sugatani et al.

(10) Patent No.: US 10,919,105 B2
(45) Date of Patent: Feb. 16, 2021

(54) THREE-DIMENSIONAL LAMINATING AND SHAPING APPARATUS AND LAMINATING AND SHAPING METHOD

(71) Applicant: ADVANTEST CORPORATION, Tokyo (JP)

(72) Inventors: Shinji Sugatani, Saitama (JP); Shigeki Nishina, Saitama (JP); Jun Matsumoto, Saitama (JP); Masahiro Takizawa, Saitama (JP); Minoru Soma, Saitama (JP); Akio Yamada, Saitama (JP)

(73) Assignee: ADVANTEST CORPORATION, Tokyo (JP)

( * ) Notice: Subject to any disclaimer, the term of this patent is extended or adjusted under 35 U.S.C. 154(b) by 267 days.

(21) Appl. No.: 16/121,581

(22) Filed: Sep. 4, 2018

(65) Prior Publication Data
US 2019/0118286 A1   Apr. 25, 2019

(30) Foreign Application Priority Data
Oct. 19, 2017 (JP) .............................. JP2017-202961

(51) Int. Cl.
*B23K 26/34* (2014.01)
*B23K 15/00* (2006.01)
(Continued)

(52) U.S. Cl.
CPC ........ *B23K 15/0086* (2013.01); *B22F 3/1055* (2013.01); *B23K 15/0013* (2013.01);
(Continued)

(58) Field of Classification Search
CPC ............ B23K 15/0046; B23K 15/0086; B23K 15/0093; B23K 26/34–342
See application file for complete search history.

(56) References Cited

U.S. PATENT DOCUMENTS 7,454,262 B2   11/2008 Larsson
2013/0055568 A1   3/2013 Dusel
(Continued)

FOREIGN PATENT DOCUMENTS

EP   2832474 A1   2/2015
JP   2015182419 A   10/2015

OTHER PUBLICATIONS

Extended European Search Report for issued counterpart European Application No. 18192171.9, issued by the European Patent Office dated Feb. 21, 2019.

*Primary Examiner* — Michael A Laflame, Jr.

(57) ABSTRACT

Provided is a three-dimensional laminating and shaping apparatus 100 including a column unit 200 that is configured to output an electron beam EB and deflect the electron beam EB toward the front surface of a powder layer 32, an electron detector 72 that is configured to detect electrons that may be emitted in a predetermined direction from the front surface of the powder layer 32 when the powder layer 32 is irradiated with the electron beam EB, a melting judging unit 410 that is configured to generate a melting signal based on the strength of the detection signal from the electron detector 72, and a deflection controller 420 that is configured to receive the melting signal to determine the condition of the irradiation the electron beam.

14 Claims, 11 Drawing Sheets

(51) Int. Cl.
    *B33Y 10/00*     (2015.01)
    *B33Y 30/00*     (2015.01)
    *B23K 15/02*     (2006.01)
    *B33Y 50/02*     (2015.01)
    *B22F 3/105*     (2006.01)
    *B29C 64/268*     (2017.01)
    *B29C 64/153*     (2017.01)
    *B33Y 40/00*     (2020.01)

(52) U.S. Cl.
    CPC .......... *B23K 15/0026* (2013.01); *B23K 15/02* (2013.01); *B29C 64/153* (2017.08); *B29C 64/268* (2017.08); *B33Y 10/00* (2014.12); *B33Y 30/00* (2014.12); *B33Y 50/02* (2014.12); *B22F 2003/1056* (2013.01); *B22F 2003/1057* (2013.01); *B22F 2999/00* (2013.01); *B33Y 40/00* (2014.12)

(56) References Cited

U.S. PATENT DOCUMENTS

| | | | |
|---|---|---|---|
| 2015/0273622 A1 | 10/2015 | Manabe | |
| 2016/0271884 A1* | 9/2016 | Herzog | B23K 15/02 |
| 2016/0325541 A1* | 11/2016 | Lavrentyev | B23K 26/083 |
| 2017/0087661 A1* | 3/2017 | Backlund | G01T 1/29 |
| 2017/0239719 A1* | 8/2017 | Buller | B23K 26/032 |
| 2018/0169784 A1* | 6/2018 | Ekberg | B29C 64/268 |
| 2018/0239335 A1* | 8/2018 | Barr | G05B 19/4099 |
| 2019/0143452 A1* | 5/2019 | Mamrak | B33Y 10/00 |
| | | | 219/76.1 |
| 2019/0358737 A1* | 11/2019 | Richardson | G06T 17/00 |
| 2020/0023435 A1* | 1/2020 | Sutcliffe | B23K 15/06 |
| 2020/0199723 A1* | 6/2020 | Chaudhury | C22F 1/04 |

* cited by examiner

THREE-DIMENSIONAL LAMINATING AND SHAPING APPARATUS AND LAMINATING AND SHAPING METHOD

The contents of the following Japanese patent application are incorporated herein by reference:
No. 2017-202961 filed in JP on Oct. 19, 2017.

BACKGROUND

1. Technical Field

The present invention relates to a three-dimensional laminating and shaping apparatus and a laminating and shaping method.

2. Related Art

A three-dimensional laminating and shaping apparatus is known that is configured to irradiate, with an electron beam, a predetermined area of a powder layer that is made of a metal material and the like so that a portion of the powder layer melts and then becomes combined with an underlying structure. In this way, a cross-section layer is formed and such cross-section layers are accumulated to finally shape a three-dimensional structure (see, for example, Patent Documents 1, 2 and 3).

PRIOR ART DOCUMENTS

Patent Documents

Patent Document 1: U.S. Pat. No. 7,454,262
Patent Document 2: Japanese Patent Application Publication No. 2015-193866
Patent Document 3: Japanese Patent Application Publication No. 2015-182419

As for a conventional three-dimensional laminating and shaping apparatus, a user of the apparatus sets the conditions under which the irradiation with the electron beam is carried out by referring to the conditions of the powder layer such as the source material and thickness of the powder layer and the conditions of the electron beam such as the accelerating voltage and the current value (see, for example, Patent Documents 1 and 2).

In reality, however, both the conditions of the powder layer and the conditions of the electron beam may change from their preset values while three-dimensional laminating and shaping is carried out. For example, a plurality of powder layers may have different thicknesses respectively or depending on where the powder layers are located, or the beam current value may vary over time. For these reasons, the user of the apparatus is required to reset the conditions under which the irradiation with the electron beam is carried out for the apparatus in accordance with such changes (see Patent Document 3).

The objective of the present invention is to provide a three-dimensional laminating and shaping apparatus that can perform irradiation with an electron beam EB with it being possible to determine the irradiation conditions for the electron beam on its own in such a manner that the powder layer can be surely melted and combined, and a laminating and shaping method.

SUMMARY

An aspect of the following disclosure provides a three-dimensional laminating and shaping apparatus to laminate and shape a three-dimensional structure. The apparatus includes a powder feeding unit configured to feed a powder layer, an electron beam column configured to output an electron beam and deflect the electron beam toward a front surface of the powder layer, an electron detector configured to detect an electron emitted from the front surface of the powder layer as a result of irradiation with the electron beam, a melting judging unit configured to detect that the powder layer is melted based on a strength of a detection signal from the electron detector and generate a melting signal, and a deflection controller configured to receive the melting signal and determine a condition of the irradiation with the electron beam.

In addition, provided is a laminating and shaping method using the above-described three-dimensional laminating and shaping apparatus. The laminating and shaping method includes by the powder feeding unit, feeding the powder layer, by the electron beam column, irradiating the powder layer with the electron beam, by the electron detector, detecting the electron emitted from the front surface of the powder layer, by the melting judging unit, generating the melting signal when a range of variation in the strength of the detection signal from the electron detector becomes less than or equal to a predetermined reference value, and by the deflection controller, setting the condition of the irradiation based on the melting signal.

Furthermore, in the laminating and shaping method of the above aspect, the melting judging unit may generate the melting signal when a difference in strength between the detection signals from different electron detectors becomes less than or equal to a predetermined reference value.

The summary clause does not necessarily describe all necessary features of the embodiments of the present invention. The present invention may also be a sub-combination of the features described above.

DESCRIPTION OF EXEMPLARY EMBODIMENTS

Preferred embodiments of a three-dimensional laminating and shaping apparatus 100 according to the present invention are described in detail with reference to FIGS. 1 to 10.

(1) Overview of an Embodiment

Figure 1:
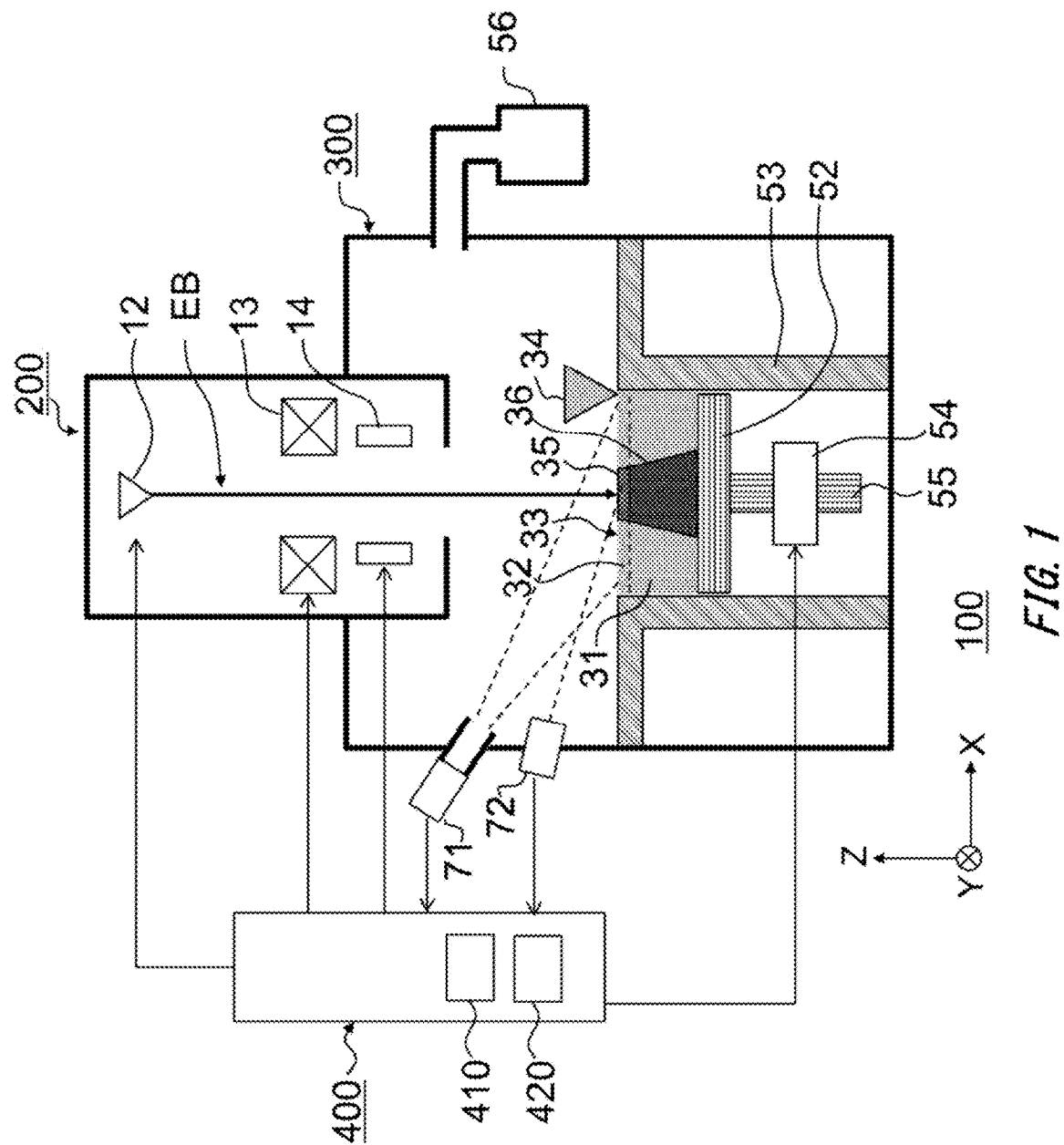
FIG. 1 shows an exemplary structure of a three-dimensional laminating and shaping apparatus 100.

FIG. 1 shows an exemplary structure of a three-dimensional laminating and shaping apparatus 100 relating to an embodiment. The three-dimensional laminating and shaping apparatus 100 includes a column unit 200 that is configured to output an electron beam EB and deflect the electron beam EB toward the front surface of a powder layer 32, an electron detector 72 that is configured to detect electrons that may be emitted in a predetermined direction from the front surface of the powder layer 32 when the powder layer 32 is irradiated with the electron beam EB, a melting judging unit 410 that is configured to generate a melting signal based on the difference in the strength of the detection signal from the electron detector 72, and a deflection controller 420 that is configured to receive the melting signal to determine the irradiation duration or irradiation velocity for the electron beam. With such configurations, the three-dimensional laminating and shaping apparatus 100 can perform the irradiation with the electron beam EB while adjusting the irradiation duration or irradiation velocity in such a manner that the powder layer 32 can be successfully melted and combined.

(2) Details of the Embodiment

FIG. 1 shows an exemplary structure of the three-dimensional laminating and shaping apparatus 100 relating to the present embodiment. The three-dimensional laminating and shaping apparatus 100 irradiates, with the electron beam EB, the powder layer 32 that is formed, for example, by powders of metal materials to melt and combine a portion of the powder layer 32 so that a cross-section layer 35 is formed and such cross-section layers 35 are laminated to shape a three-dimensional structure 36.

The three-dimensional laminating and shaping apparatus 100 includes the column unit 200, a shaping unit 300, and a controller 400. The column unit 200 is positioned so that the electron beam EB output from the column unit 200 can irradiate the powder layer 32, which is maintained within the shaping unit 300. The electron beam EB is controlled by the controller 400 and irradiates a predetermined area of the powder layer 32.

The column unit 200 has an electron source 12, which is controlled by the controller 400. The electron source 12 generates electrons using heat or electric fields. The electrons generated by the electron source 12 are accelerated in the −Z direction by a predetermined accelerating voltage (for example, 60 KV) to be output in the form of the electron beam EB.

The column unit 200 has an electron lens 13, which is controlled by the controller 400. The electron lens 13 controls the electron beam EB to converge on the front surface 33 of the powder layer 32. The electron lens 13 is, for example, constituted by a coil wound around the axis of the lens and a magnetic element (yoke) that surrounds the coil and has a space therein axially symmetrical with respect to the axis of the lens.

The column unit 200 has a deflector 14, which is controlled by the controller 400. The deflector 14 deflects the electron beam EB to designate the position irradiated with the electron beam EB in the in-plane directions (the X and Y directions) of the powder layer 32. The deflector 14 has, for example, two pairs of deflection coils, one of which includes deflection coils facing each other in the X-axis direction with the Z-axis being sandwiched therebetween and the other includes deflections coils facing each other in the Y-axis direction with the Z-axis being sandwiched therebetween. Here, the Z-axis coincides with the path along which the electron beam EB travels.

The powder layer 32, which is to be irradiated with the electron beam EB output from the column unit 200, is maintained by a stage 52 and a side wall unit 53 included in the shaping unit 300. The stage 52 and the side wall unit 53 flattens the powder layer 32, which is made of powders of metal materials fed from a powder feeding unit 34, in such a manner that a front surface 33 of the powder layer 32 is substantially parallel to the upper surface of the stage 52 and maintains the resulting powder layer 32.

When melted by the irradiation with the electron beam, the powder layer 32 is combined with the upper edge portion of the three-dimensional structure 36 that has already been laminated. In this way, a cross-section layer 35 is formed. The newly formed cross-section layer 35 extends the three-dimensional structure 36 in the Z-axis direction. Excluding the cross-section layer 35 that is laminated on the three-dimensional structure 36, the remaining powder layer 32 is left and accumulated in the form of the powders 31 of the metal materials around the three-dimensional structure 36.

The stage 52 is moved in the Z-axis direction (the height direction) by a driving unit 54 and a driving rod 55, which are controlled by the controller 400. The stage 52 is moved in the Z-axis direction along the inner side surfaces of the side wall unit 53, which is, for example, a cylindrical member extending in the Z-axis direction.

The height of the stage 52 in the Z-axis direction is set such that the front surface 33 of the powder layer 32 is maintained at substantially the same height in the Z-axis direction while the powder layer 32 is irradiated with the electron beam. In other words, after the cross-section layer 35 is laminated on the three-dimensional structure 36, the stage 52 is moved down every time a new powder layer 32 is fed to cancel the thickness of the new powder layer 32 in the Z-axis direction.

The shaping unit 300 has an evacuating unit 56. The evacuating unit 56 evacuates the path along which the electron beam travels in the three-dimensional laminating and shaping apparatus 100. The evacuating unit 56 evacuates the internal space of the column unit 200 and the space in the vicinity of the front surface 33 of the powder layer 32 within the shaping unit 300 to realize a predetermined level of vacuum. This is because the electron beam loses its energy when colliding with gas molecules in the air.

The three-dimensional laminating and shaping apparatus 100 relating to the present embodiment includes, in the shaping unit 300, a radiation thermometer 71 and an electron detector 72 in order to monitor the state of the powder layer 32 during the irradiation with the electron beam EB. The radiation thermometer 71 is monitoring means provided in a conventional three-dimensional laminating and shaping apparatus.

The radiation thermometer 71 detects the radiation of the heat from the front surface 33 of the powder layer 32 to measure the front surface temperature of the powder layer 32. The radiation thermometer 71 is capable of dividing the front surface 33 of the powder layer 32 into pixel regions of a predetermined size and measuring the temperature in the respective pixel regions in parallel.

Figure 10:
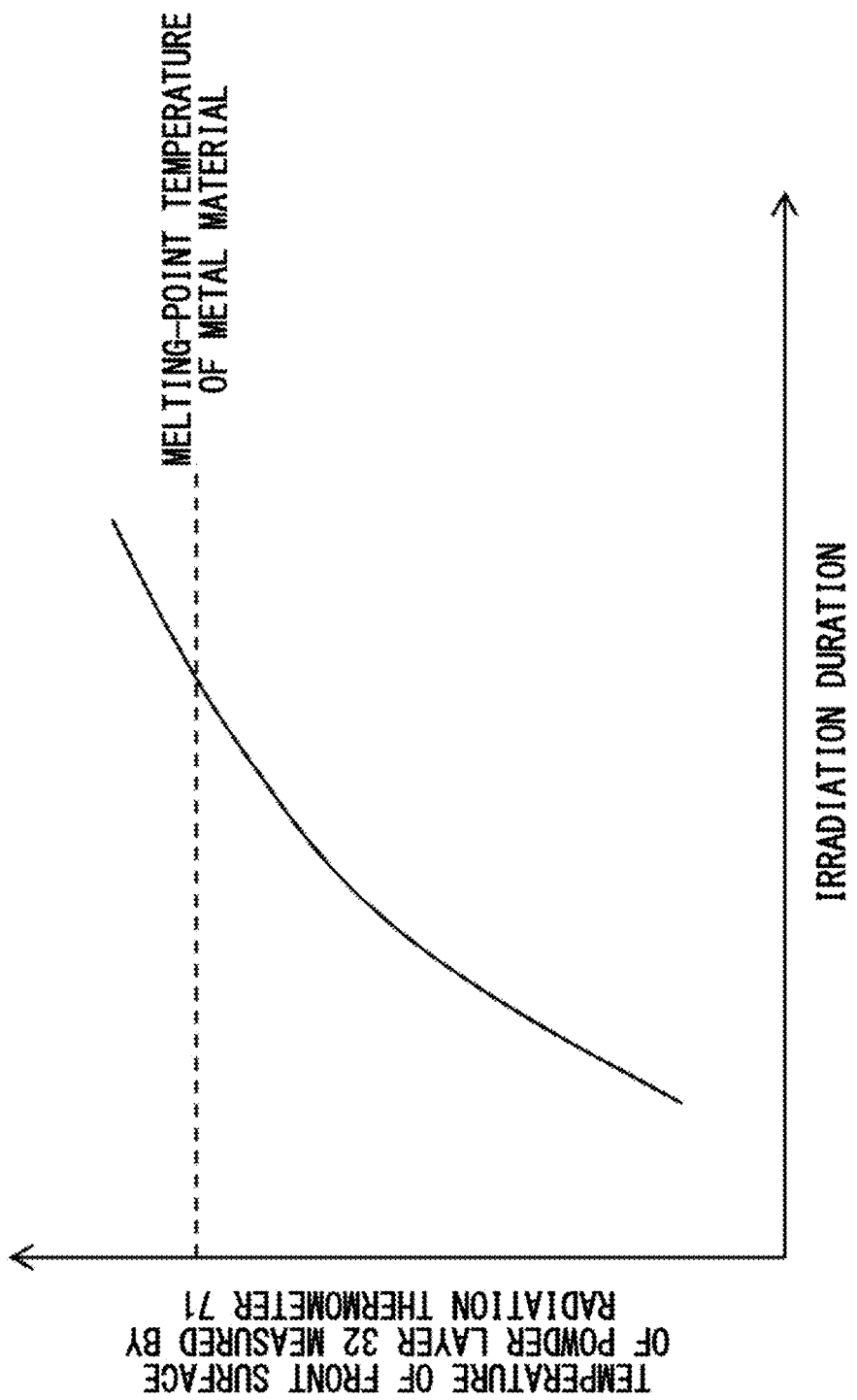
FIG. 10 is a graph showing the change in the temperature of the front surface of the powder layer 32 that is measured by a radiation thermometer 71.

FIG. 10 is a graph showing how the front surface temperature of the powder layer 32, which is measured by the radiation thermometer 71, varies. The horizontal axis represents the irradiation duration, during which a predetermined area of the front surface 33 of the powder layer 32 is continuously irradiated with the electron beam EB. The vertical axis represents the temperature of the pixel region in which the highest temperature is measured on the front surface of the powder layer 32.

The front surface temperature of the powder layer 32 rises in accordance with the irradiation duration of the electron beam EB. When a predetermined irradiation duration elapses, the front surface temperature of the powder layer 32 exceeds the melting-point temperature. Accordingly, at least a portion of the powder layer 32 is melted. The measured results shown in FIG. 10, however, indicate that it is difficult to determine the point of time during the irradiation at which the area of the powder layer 32 irradiated with the electron beam EB is melted and combined with the upper edge of the three-dimensional structure 36. The front surface temperature of the powder layer 32, which is measured by the radiation thermometer 71, continuously rises in accordance with the irradiation duration of the electron beam EB and does not sensitively indicate the change in the state of the powder layer 32.

The three-dimensional laminating and shaping apparatus 100 of the present embodiment has the electron detector 72 in the shaping unit 300 as shown in FIG. 1. The electron detector 72 is positioned on the side from which the electron beam EB enters the powder layer 32 and so as to be capable of detecting the electrons emitted from the front surface of the powder layer 32. In other words, the electron detector 72 is positioned so as not to interfere with the lower portion of the column unit 200, which is coupled with the shaping unit 300. For example, the electron detector 72 may be mounted on the side wall of the shaping unit 300, or the like.

In addition, the electron detector 72 is preferably installed in such a manner that the detecting surface of the electron detector 72 faces the irradiated position on the front surface 33 of the powder layer 32 and that the straight line connecting the electron detector 72 and the irradiated position has an angle of 45 to 80 degrees relative to the input direction (the Z direction) of the electron beam EB.

The electron detector 72 detects the electrons emitted in a predetermined direction in vacuum when the electron beam EB is incident on the powder layer 32 and then scattered in the vicinity of the front surface 33 of the powder layer 32. The electron detector 72 may be a semiconductor detector that can perform the detection by converting the intensity of the electrons that are emitted in a predetermined direction in vacuum and reach the vicinity of the electron detector 72 (the quantity of the electrons that reach within a unit time) into a magnitude of a current signal (the strength of the detection signal). Alternatively, the electron detector 72 may be an electron multiplier that can perform the detection by multiplying the electrons that reach the vicinity of the electron detector 72. The electron detector 72 sends to the controller 400 a detection signal having a strength that is proportional to the detected intensity of the electrons.

The melting judging unit 410 included in the controller 400 judges that the powder layer 32 is melted and combined based on the detection signal from the electron detector 72. The deflection controller 420 included in the controller 400 controls the conditions for the irradiation with the electron beam EB in response to the result of the judgment made by the melting judging unit 410.

The following describes how the irradiation with the electron beam is performed in the three-dimensional laminating and shaping apparatus 100 and how the electron detector 72, the melting judging unit 410 and the deflection controller 420 operate.

Figure 2:
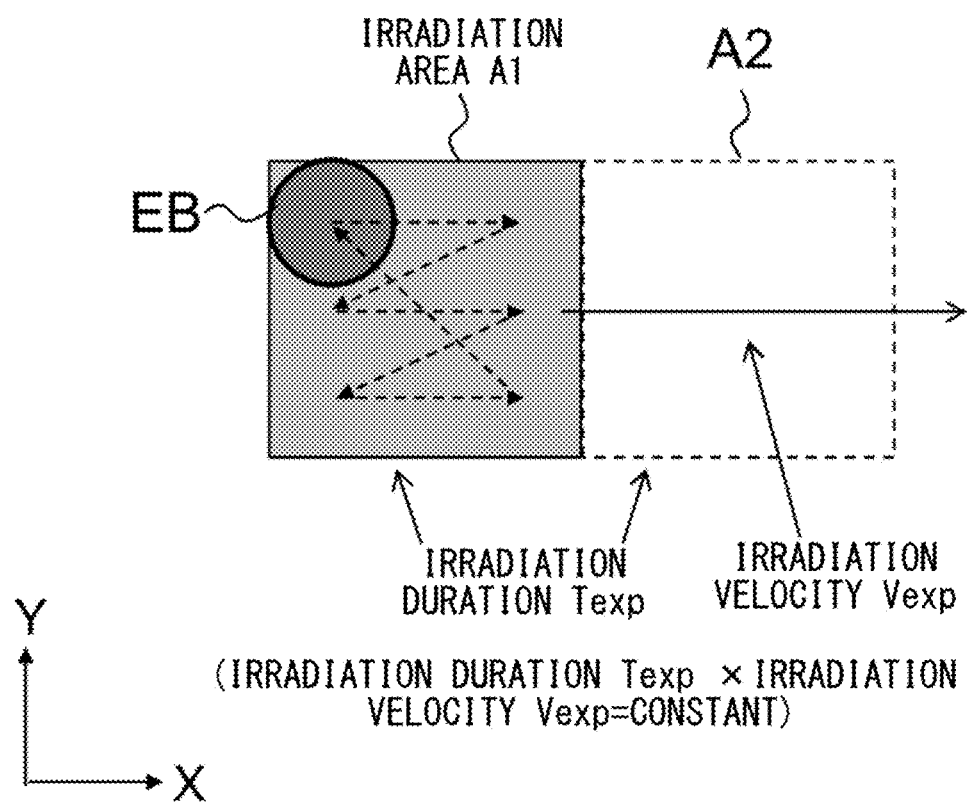
FIG. 2 shows, as an example, how a front surface 33 of a powder layer 32 is irradiated with an electron beam EB.

FIG. 2 shows, as an example, how the front surface 33 of the powder layer 32 is irradiated with the electron beam. The region indicated by "EB" in FIG. 2 corresponds to a shot (the region irradiated at a time) of the electron beam EB. In other words, the shot shown in FIG. 2 has a size corresponding to the size of the image formed by the electron beam EB at a position of the front surface 33. The size of the shot (shot size) is set similar to or smaller than the size of the powders of the source material of the powder layer 32.

Here, the size of the powders of the source material means the particle size of the metal particles when the powders of the source material include only primary metal particles and means the particle size of the secondary particle when the powders of the source material include secondary particles into which a plurality of metal particles coalesce.

The irradiation areas A1, A2, ... and the like each indicate the area that is irradiated with the electron beam EB at substantially the same time and melted. In other words, the electron beam EB is continuously applied in the present embodiment, and, for example, the irradiation area A1 is irradiated with the electron beam EB during the irradiation duration Texp in such a manner that the electron beam EB entirely fills the irradiation area A1 as indicated by the dotted lines in the irradiation area A1 and resultantly melted. The electron beam EB moves onto the next irradiation area A2 once the irradiation area A1 is melted. By repeatedly irradiating every irradiation area in the above-described manner, the three-dimensional laminating and shaping apparatus 100 increases the melted irradiation areas on the front surface 33 of the powder layer 32 at the irradiation velocity Vexp. Note that the irradiation duration Texp and the irradiation velocity Vexp are inversely proportional to each other. When one of the irradiation duration Texp and the irradiation velocity Vexp is given, the other is set.

Figure 3A:
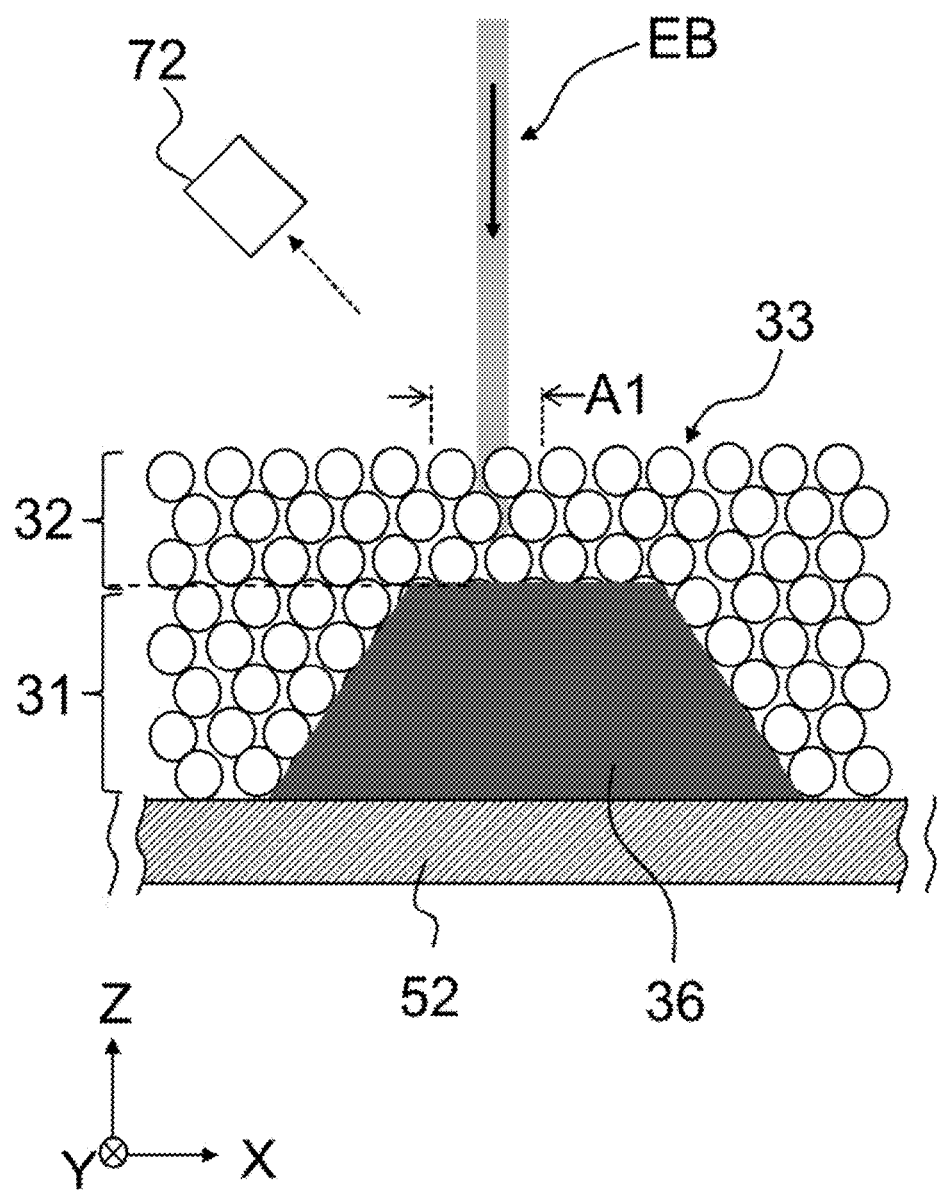
FIG. 3A shows the state of the powder layer 32 before the powder layer 32 is melted.
Figure 3B:
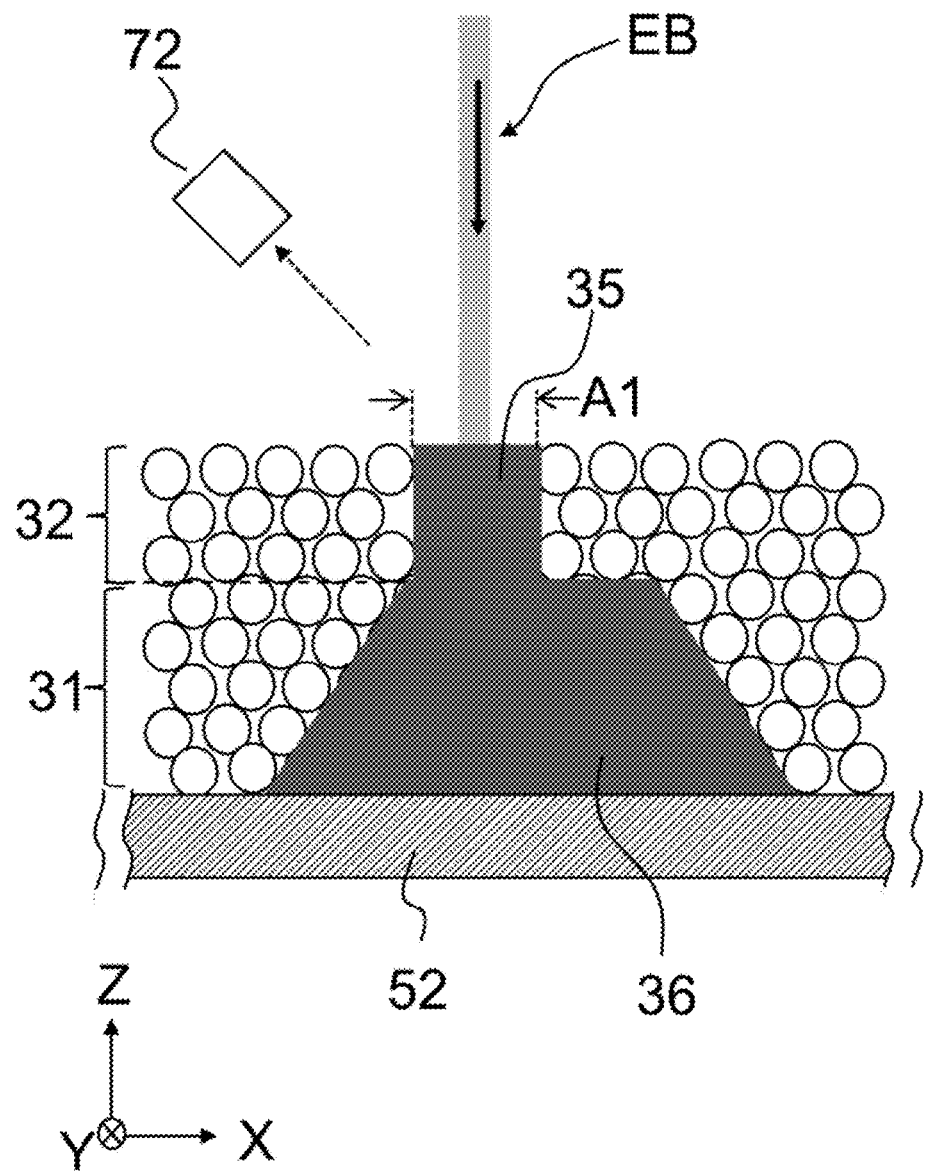
FIG. 3B shows that the powder layer 32 is melted and combined with an underlying three-dimensional structure 36.

FIG. 3A schematically shows the powder layer 32 before the powder layer 32 is melted, and FIG. 3B schematically shows the state of the powder layer 32 when the powder layer 32 has been completely melted and combined with the underlying three-dimensional structure 36. The following description is made in relation to the example where the irradiation area A1 is irradiated with the electron beam EB in the manner described with reference to FIG. 2. In FIG. 2 and the subsequent drawings, the constituents that are the same as the corresponding constituents shown in FIG. 1 are assigned with the same reference numerals as in FIG. 1 and not described again.

In at least a portion of the powder layer 32 included in the irradiation area, the fine particles of the metal material pile up in the form of particles before the powder layer 32 is completely melted. In this state, the front surface 33 of the powder layer 32 is uneven as it is constituted by fine particles. In addition, there are gaps between the fine particles in the powder layer 32.

When the powder layer 32 in the state shown in FIG. 3A is irradiated with the electron beam EB, the intensity of the electrons emitted from the front surface of the powder layer 32 varies depending on the position irradiated with the electron beam EB in the irradiation area A1. This is because, when the shot size of the electron beam EB is less than or equal to the size of the metal fine particles constituting the powder layer 32, the intensity of the electrons emitted is affected by the convex and concave features of the front surface of the powder layer 32 and the gaps between the fine particles.

As shown in FIG. 3B, on the other hand, when the powder layer 32 is completely melted and combined with the underlying three-dimensional structure 36, the resulting cross-section layer 35 has a smooth front surface facing the vacuum. If the irradiation area A1 is irradiated with the electron beam EB at this point, the intensity of the electrons emitted from the front surface of the cross-section layer 35 is substantially constant irrespective of the position irradiated with the electron beam EB. This is because the front surface of the cross-section layer 35 does not have convex and concave features that are sized similarly to the shot of the electron beam EB.

In other words, when the powder layer 32 is in the state shown in FIG. 3A, the detection signal representative of the electrons detected by the electron detector 72 has a strength varying depending on the position irradiated with the electron beam EB in the irradiation area A1. When the powder layer 32 is in the state shown in FIG. 3B, the strength of the detection signal hardly varies in accordance with different irradiated positions in the irradiation area A1.

Figure 4:
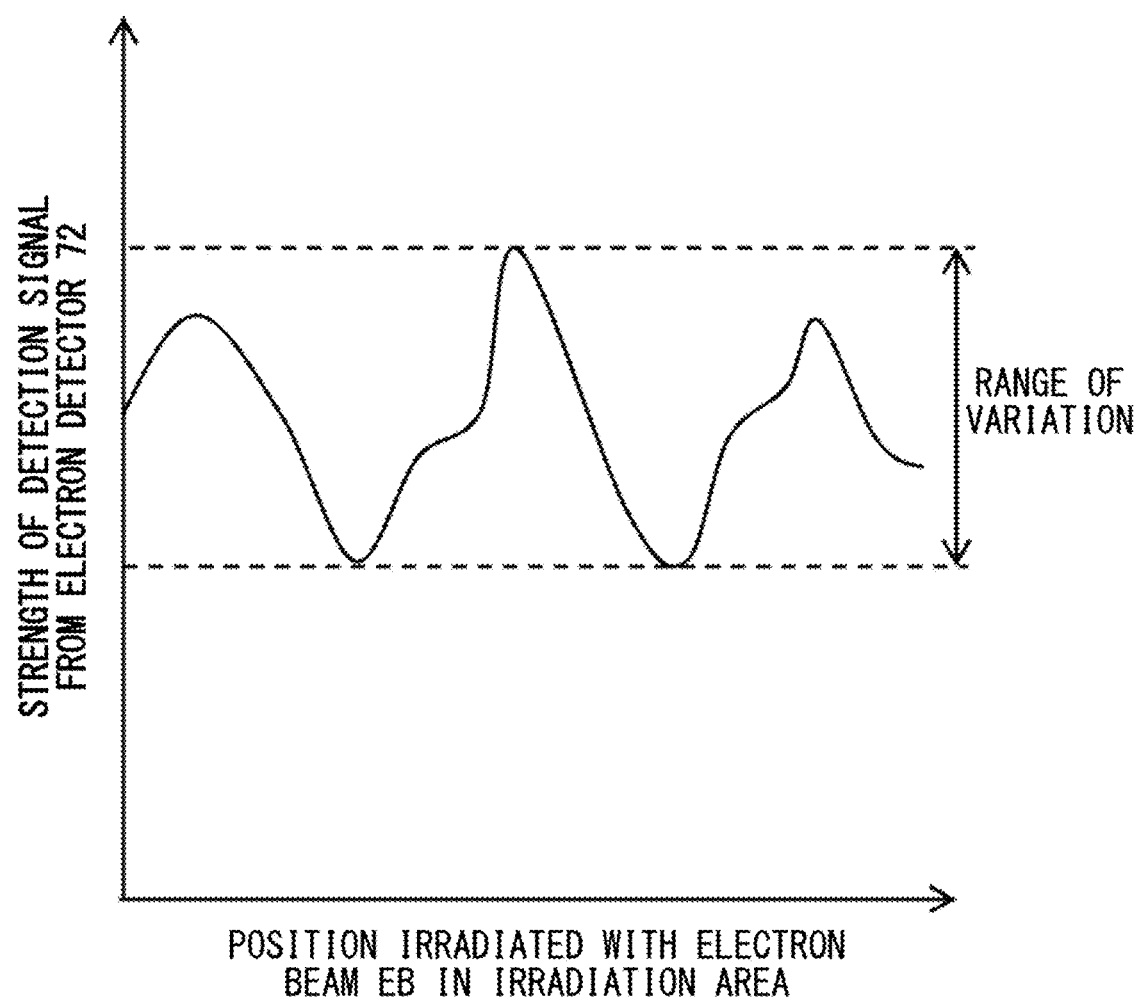
FIG. 4 shows, as an example, that the strength of a detection signal from an electron detector 72 varies when the position irradiated with the electron beam EB is changed within an irradiation area and the range of the variation.

FIG. 4 shows, as an example, how the position irradiated with the electron beam EB is related to the strength of the detection signal from the electron detector 72 when the powder layer 32 is in the state shown in FIG. 3A, for example. When the position irradiated with the electron beam EB is changed within the irradiation area A1, the strength of the detection signal from the electron detector 72 varies due to the convex and concave features of the front surface of the powder layer 32 and the gaps between the fine particles. In this case, the difference in the strength of the detection signal from the electron detector 72 means the range of the variation in the strength of the signal that can be measured by the electron detector 72 when the position irradiated with the electron beam is changed within the irradiation area.

Figure 5:
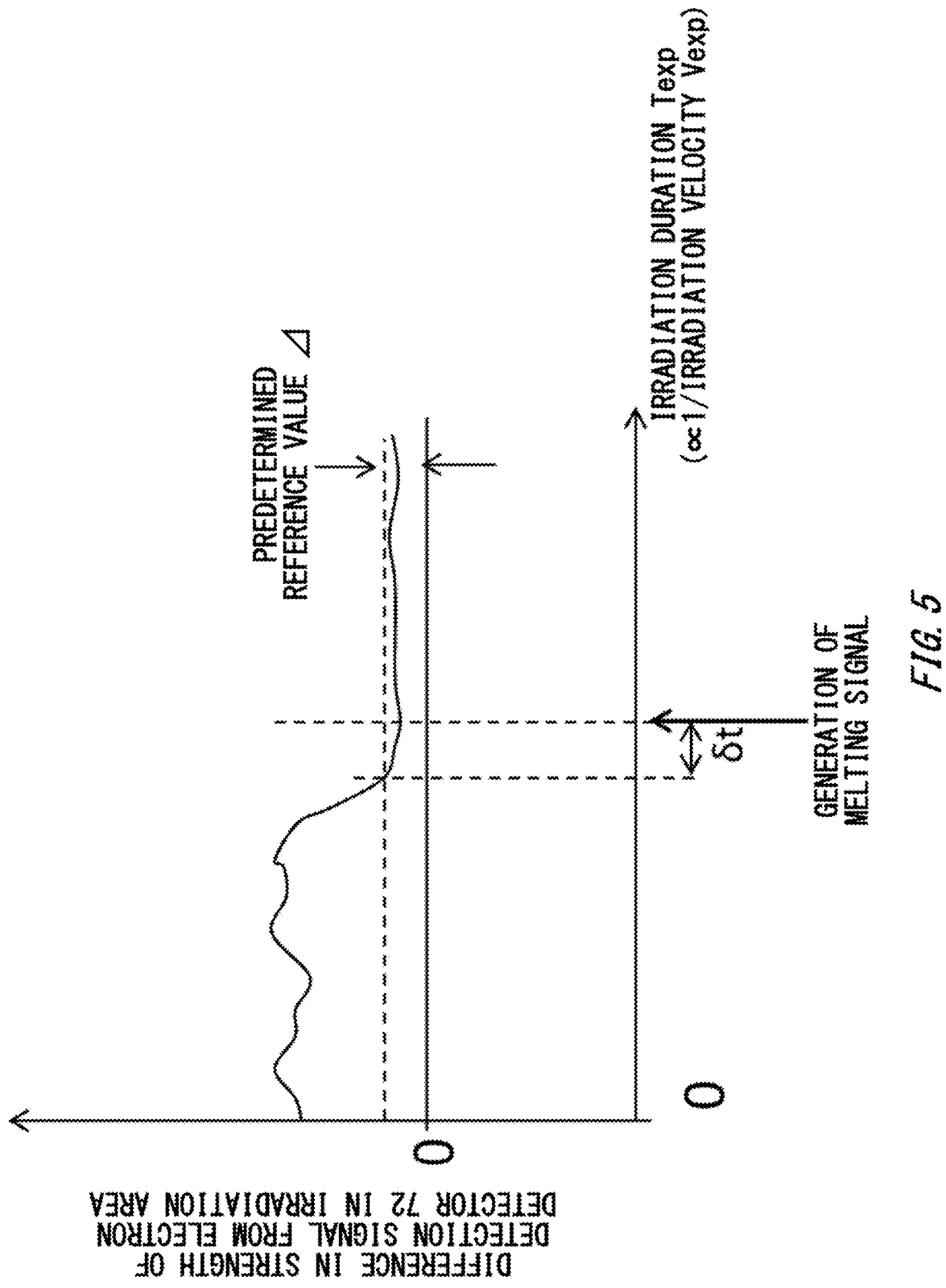
FIG. 5 is a graph showing, as an example, how the irradiation duration Texp or irradiation velocity Vexp of the electron beam EB is related to the amount of the change in the strength of the detection signal from the electron detector 72.

FIG. 5 is a graph showing, as an example, how the irradiation duration of the electron beam EB is related to the difference in the strength of the detection signal from the electron detector 72. The horizontal axis represents the irradiation duration Texp during which each irradiation area is irradiated with the electron beam EB. Since the irradiation duration Texp is inversely proportional to the irradiation velocity Vexp, the direction in which the value represented by the horizontal axis of FIG. 5 increases corresponds to the direction in which the irradiation velocity Vexp of the electron beam EB decreases. The vertical axis represents the difference between the maximum strength of the detection signal and the minimum strength of the detection signal that is caused by changing the position irradiated with the electron beam EB in the irradiation area. The difference in the strength of the detection signal represented by the vertical axis is equivalent to the range of the variation shown in FIG. 4.

FIG. 5 shows that, as the irradiation duration Texp increases, the difference in the strength of the detection signal from the electron detector 72 in the irradiation area changes in a discontinuous manner. The difference in the strength is at first found when changing the irradiated position in the irradiation area but eventually hardly found (the difference in the strength of the detection signal is approximately zero). This discontinuous change corresponds to a change in the state of the powder layer 32 in the irradiation area from the state in which the powder layer 32 includes fine particles before melted as shown in FIG. 3A to the state in which the powder layer 32 is melted and integrally combined with the underlying three-dimensional structure 36 to form the cross-section layer 35 as shown in FIG. 3B.

As shown in FIG. 5, when a given period of time δt elapses after the difference in the strength of the detection signal in the irradiation area satisfies a predetermined reference value Δ, the powder layer 32 is believed to be always in the similarly melted state. The three-dimensional laminating and shaping apparatus 100 can successfully determine that the powder layer 32 in the irradiation area is completely melted by the irradiation with the electron beam EB and formed into the cross-section layer 35, by appropriately setting the reference value Δ and the period of time δt for the difference in the strength of the detection signal measured by the electron detector 72.

In FIG. 5, the timing indicated by the arrow (marked as "GENERATION OF MELTING SIGNAL") represents the timing at which a given period of time Δt elapses after the difference in the strength of the detection signal in the irradiation area satisfies a predetermined reference value Δ. When the irradiation duration indicated by the arrow elapses, the powder layer 32 in the irradiation area irradiated with the electron beam EB has transformed into the cross-section layer 35, which has a smooth front surface.

The three-dimensional laminating and shaping apparatus 100 relating to the present embodiment measures the difference in the strength of the detection signal from the electron detector 72 in each of the irradiation areas A1, A2, . . . . The three-dimensional laminating and shaping apparatus 100 detects the irradiation duration defined by the arrow in FIG. 5 by measuring the difference in the strength of the detection signal in the irradiation area while increasing the irradiation duration Texp of the electron beam EB. Alternatively, the three-dimensional laminating and shaping apparatus 100 may detect the irradiation velocity indicated by the arrow in FIG. 5 by measuring the difference in the strength of the detection signal from the electron detector 72 while lowering the irradiation velocity Vexp.

Figure 6:
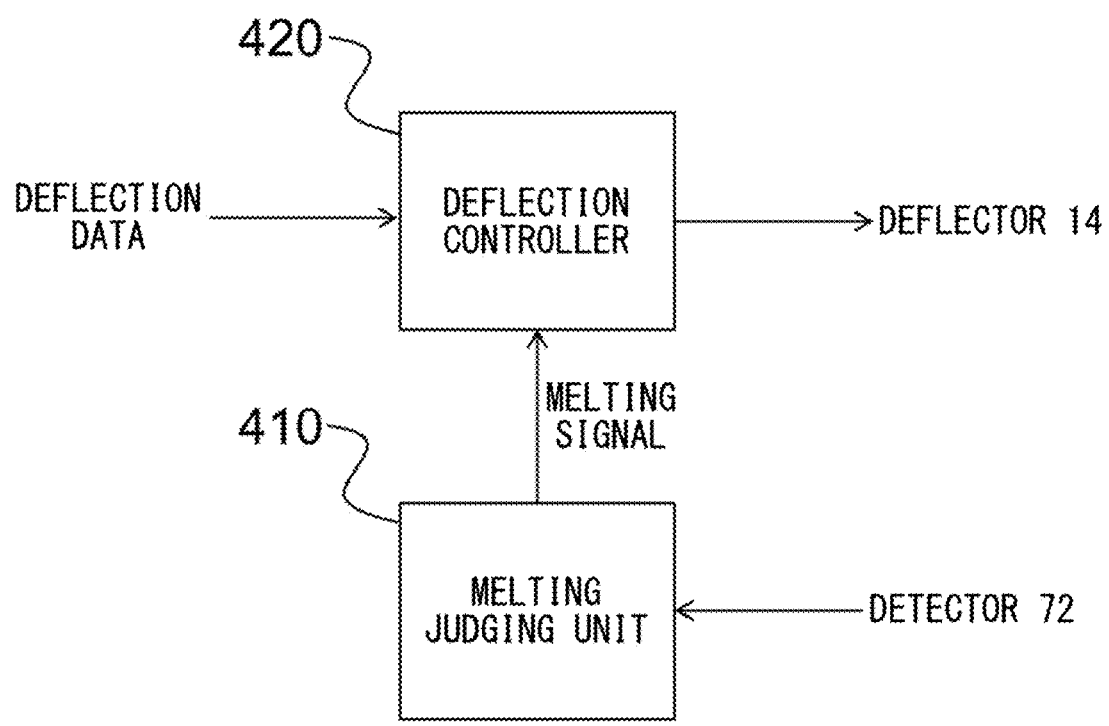
FIG. 6 shows an exemplary structure of (part of) a controller 400.

FIG. 6 shows the structures of the melting judging unit 410 and the deflection controller 420, which form part of the controller 400. The melting judging unit 410 receives the detection signal from the electron detector 72.

The melting judging unit 410 measures, while each of the irradiation areas A1, A2, . . . (see FIG. 2) of the powder layer 32 is entirely irradiated with the electron beam EB once in such a manner that the electron beam EB fills each irradiation area once, the difference in the strength of the detection signal from the electron detector 72 (that is to say, the value obtained by subtracting the minimum value of the detection signal from the maximum value, which are measured while the electron beam fills each irradiation area once). The melting judging unit 410 measures the above-mentioned difference in the strength of the detection signal while increasing the irradiation duration Texp. The melting judging unit 410 identifies the timing at which the difference in the strength of the detection signal becomes less than or equal to the predetermined reference value Δ and generates a melting signal when a given period of time δt elapses after the identified timing. The melting judging unit 410 outputs the generated melting signal to the deflection controller 420.

Here, instead of measuring the difference in the strength of the detection signal while increasing the irradiation duration Texp, the melting judging unit 410 may measure the difference in the strength of the detection signal while lowering the irradiation velocity Vexp and generate the melting signal.

The deflection controller 420 receives the melting signal and outputs to the deflector 14 deflection data used to deflect the electron beam to the next irradiation area. In this way, the three-dimensional laminating and shaping apparatus 100 relating to the present embodiment detects that the powder layer 32 is melted and combined in each irradiation area in the powder layer 32, thereby expanding the area that has been irradiated with the electron beam.

Figure 7:
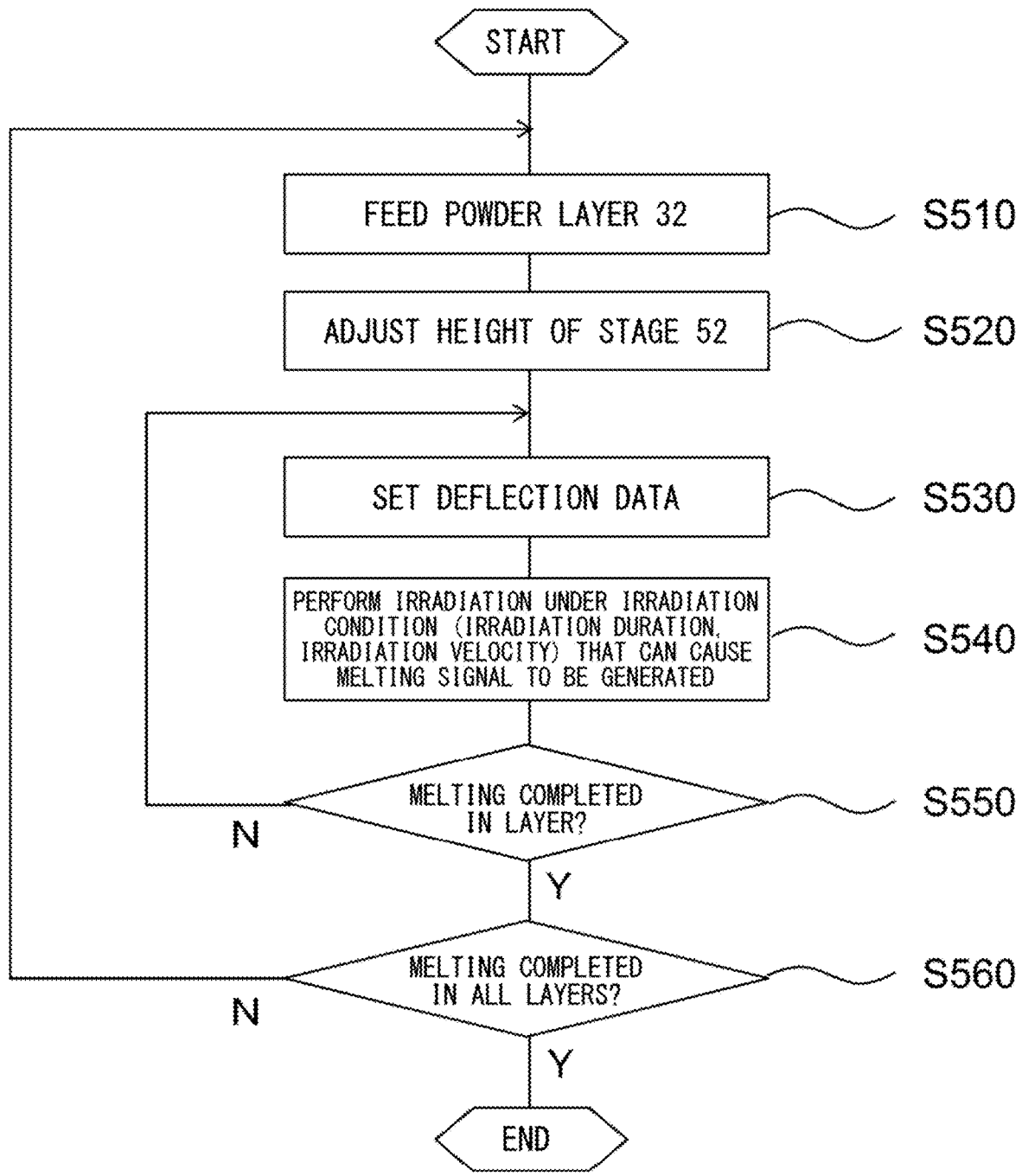
FIG. 7 shows an exemplary flow of operations for a laminating and shaping method of the three-dimensional laminating and shaping apparatus 100.

FIG. 7 shows an exemplary flow of operations for a laminating and shaping method of the three-dimensional laminating and shaping apparatus 100 having the above-described configurations.

In the three-dimensional laminating and shaping apparatus 100, the powder feeding unit 34 feeds the powders of the metal materials from (S510). The three-dimensional laminating and shaping apparatus 100 feeds the powder layer 32 that has been flattened to be substantially parallel to the upper surface of the stage 52.

The three-dimensional laminating and shaping apparatus 100 adjusts the height of the stage 52 (S520). The three-dimensional laminating and shaping apparatus 100 adjusts the height of the stage 52 in the Z-axis direction in such a manner that the height of the front surface 33 of the newly fed powder layer 32 is the same as the predetermined height of the electron beam irradiation plane.

The three-dimensional laminating and shaping apparatus 100 uses the deflection controller 420 to output deflection data to the deflector 14 based on the shape data of the three-dimensional structure 36 and sets an irradiation area on the front surface 33 of the powder layer 32 (S530).

While irradiating the set irradiation area with the electron beam, the three-dimensional laminating and shaping apparatus 100 uses the ammeter 73 to perform the measurement and output the measured results to the melting judging unit 410. The melting judging unit 410 generates a melting signal for the irradiation area based on the measured results indicating the difference in the strength of the detection signal from the electron detector 72. The three-dimensional laminating and shaping apparatus 100 continues irradiating the irradiation area until the melting signal is generated (S540).

The three-dimensional laminating and shaping apparatus 100 judges whether all of the melting operations have been completed in the layer same as the powder layer 32, which is irradiated in the step S540 (S550).

If all of the melting operations have not been completed in the layer same as the powder layer 32 (S550: No), the three-dimensional laminating and shaping apparatus 100 uses the deflector 14 to deflect the electron beam to irradiate a new irradiation area with the electron beam (S530 to S540). If all of the melting operations have been completed in the layer same as the powder layer 32 (S550: Yes), the three-dimensional laminating and shaping apparatus 100 judges whether all of the cross-section layers 35 required to form the three-dimensional structure 36 have been laminated (S560).

If all of the cross-section layers have not been laminated (S560: No), the three-dimensional laminating and shaping apparatus 100 feeds a new powder layer 32 (S510) and performs a laminating and shaping operation on the next powder layer 32 (S520 to S550). If all of the cross-section layers have been laminated (S560: Yes), the three-dimensional laminating and shaping apparatus 100 completes the laminating and shaping operations for the three-dimensional structure 36.

By performing the laminating and shaping method indicated by the exemplary flow of operations in FIG. 7, the three-dimensional laminating and shaping apparatus 100 can detect that the powder layer 32 is melted and combined for every irradiation area in every powder layer 32 while laminating the cross-section layers 35.

As described above, the three-dimensional laminating and shaping apparatus 100 relating to the present embodiment can determine on its own such irradiation conditions that can ensure that the powder layer 32 is melted and combined while shaping a three-dimensional structure by the irradiation with the electron beam EB.

Second Embodiment

Figure 8:
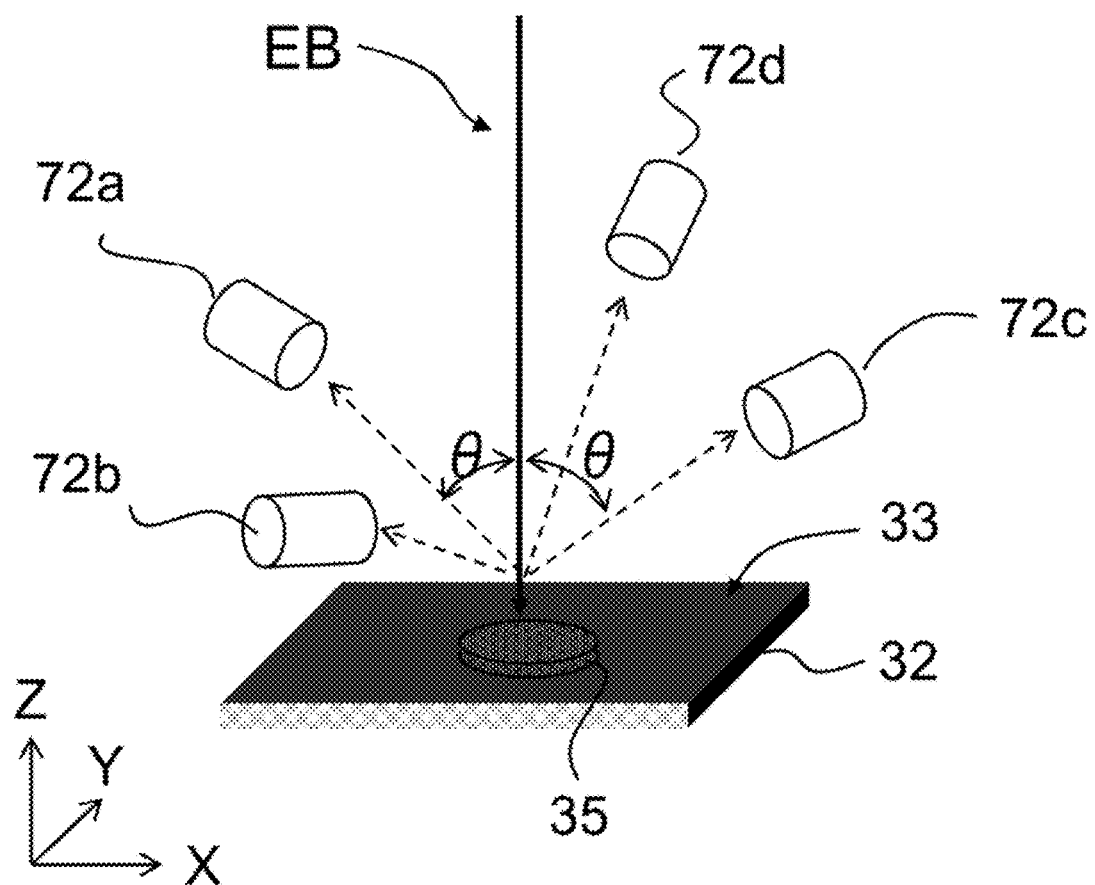
FIG. 8 shows an exemplary case where a plurality of electron detectors 72a, 72b, 72c and 72d are positioned in different directions relative to the position irradiated with the electron beam EB.

FIG. 8 shows how electron detectors 72 are positioned in a three-dimensional laminating and shaping apparatus 100 relating to a second embodiment. The three-dimensional laminating and shaping apparatus 100 relating to the second embodiment includes a plurality of electron detectors 72 that are differently positions to surround the position irradiated with an electron beam EB. Each electron detector 72 detects the intensity of the electrons emitted in a different direction with respect to the position irradiated with the electron beam EB on the cross-section layer 35.

In other words, in the example shown in FIG. 8, four electron detectors 72a, 72b, 72c and 72d are positioned to surround the position on the front surface 33 of the cross-section layer 35 irradiated with the electron beam EB at substantially equal distances from the irradiated position. The four electron detectors 72a, 72b, 72c and 72d are positioned in four different directions that are defined in the coordinate system whose original point is the position irradiated with the electron beam EB in such a manner that the four directions have substantially the same angle θ with respect to the Z-axis direction and have substantially equal angular intervals therebetween around the Z-axis.

The electron detectors 72a and 72c are arranged so as to face each other in the X-axis direction with the Z-axis sandwiched therebetween. The electron detectors 72b and 72d are arranged so as to face each other in the Y-axis direction with the Z-axis sandwiched therebetween. The electron detectors 72a, 72b, 72c and 72d detect the electrons that are emitted from the irradiation area, in the powder layer 32, irradiated with the electron beam EB toward the respective electron detectors 72.

When the powder layer 32 is not completely melted and thus has the convex and concave features and gaps in the front surface 33 of the powder layer 32 (see FIG. 3A), the electrons emitted from the cross-section layer 35 have varying intensities depending on the directions in which the electrons are emitted. This is because the emissions of the electrons from the powder layer 32 is affected by the state of the front surface 33 and the electrons are thus easily emitted in one or more of the directions and difficulty emitted in other directions. If this is the case, the electron detectors 72a and 72c, which face each other in the X-axis direction with the Z-axis being sandwiched therebetween, generate detection signals having different strengths. The same is true to the electron detectors 72b and 72d, which face each other in the Y-axis direction with the Z-axis being sandwiched therebetween.

When the powder layer 32 is completely melted in the irradiation area irradiated with the electron beam EB and has transformed into a uniform cross-section layer 35 having a smooth front surface 33 (see FIG. 3B), the electrons are emitted from the cross-section layer 35 uniformly around the Z-axis. If this is the case, electron detectors 72a, 72b, 72c and 72d generate detection signals representative of substantially equal intensities.

In the above-described case, the difference in the strength of the detection signal from the electron detector means the difference in strength between the detection signals from the plurality of electron detectors 72a, 72b, 72c and 72d that are positioned in the different directions relative to the position irradiated with the electron beam.

Here, the number of the electron detectors 72 provided to detect the difference in signal strength between different detection directions is not necessarily limited to four, and more electron detectors 72 may be provided around the position on the cross-section layer 35 irradiated with the electron beam EB. In this case, it is also preferable that the plurality of electron detectors 72 are arranged so as to have substantially the same angle with respect to the Z-axis direction and at substantially equal angular intervals around the Z-axis.

Figure 9:
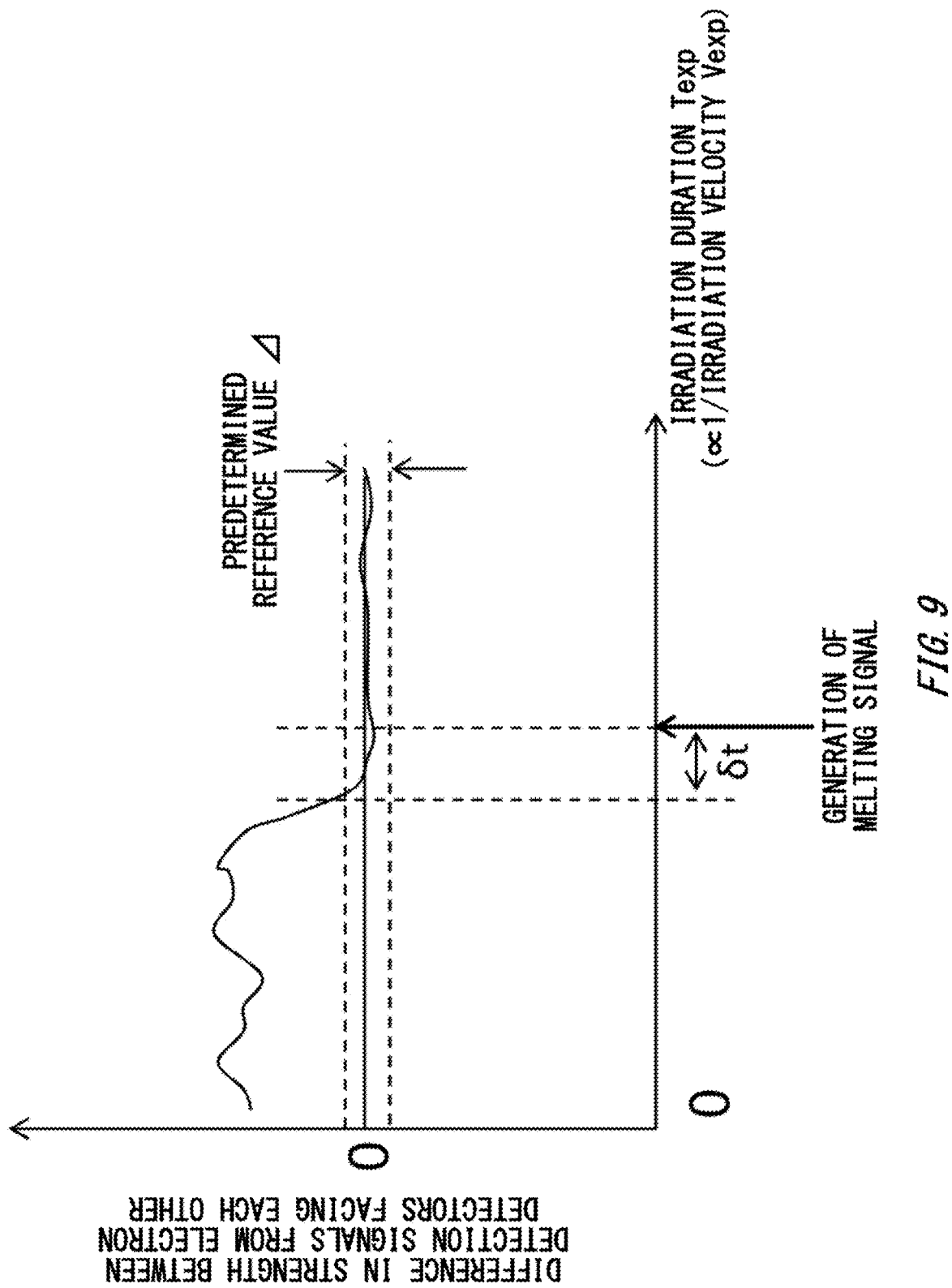
FIG. 9 is a graph showing, as an example, how the irradiation duration Texp or irradiation velocity Vexp of the electron beam EB is related to the difference in strength between the detection signals from the electron detectors 72 that are positioned in different directions from each other.

FIG. 9 shows the difference in strength between the detection signals from the electron detectors that face each other with the Z-axis being sandwiched therebetween. Similarly to FIG. 5, FIG. 9 also shows that, as the irradiation duration Texp increases, the difference in strength between the detection signals from the electron detectors that face each other discontinuously changes to approximately zero. This discontinuous change corresponds to a change in the state of the powder layer 32 from the state in which the powder layer 32 includes fine particles before melted as shown in FIG. 3A to the state in which the powder layer 32 is melted and integrally combined with the underlying three-dimensional structure 36 to form the cross-section layer 35 as shown in FIG. 3B.

The melting judging unit 410 identifies the timing at which the difference in strength between the detection signals from the electron detectors that face each other with the Z-axis being sandwiched therebetween becomes less than or equal to the predetermined reference value Δ and generates a melting signal when a given period of time Δt elapses after the identified timing.

The deflection controller 420 receives the melting signal and outputs to the deflector 14 deflection data used to deflect the electron beam to the next irradiation area.

In this way, the three-dimensional laminating and shaping apparatus 100 relating to the second embodiment detects that the powder layer 32 is melted and combined in each irradiation area in the powder layer 32, thereby expanding the area that has been irradiated with the electron beam.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

12: electron source, 13: electron lens, 14: deflector, 31: powder, 32: powder layer, 33: front surface, 34: powder feeding unit, 35: cross-section layer, 36: three-dimensional structure, 52: stage, 53: side wall unit, 54: driving unit, 55: driving rod, 56: evacuating unit, 71: radiation thermometer, 72, 72a, 72b, 72c, 72d: electron detector, 100: three-dimensional laminating and shaping apparatus, 200: column unit, 300: shaping unit, 400: controller, 410: melting judging unit, 420: deflection controller

What is claimed is:

1. A three-dimensional laminating and shaping apparatus to laminate and shape a three-dimensional structure, comprising:
   a powder feeding unit configured to feed a powder layer;
   an electron beam column configured to output an electron beam and deflect the electron beam toward a front surface of the powder layer;
   an electron detector configured to detect an amount of electrons emitted from the front surface of the powder layer as a result of irradiation with the electron beam;
   a melting judging unit configured to detect, based on a range of variation over time in a strength of a detection signal from the electron detector, that the powder layer is melted and generate a melting signal based on a reduced level of the range in variation over time of the strength of the detection signal from the electron detector; and
   a deflection controller configured to receive the melting signal and determine a condition of the irradiation with the electron beam.

2. A three-dimensional laminating and shaping apparatus as set forth in claim 1, wherein
   the deflection controller repeatedly performs irradiation with the electron beam in each of a plurality of irradiation areas that are obtained by dividing a cross-section of the three-dimensional structure, and each of the irradiation areas is irradiated by moving a shot of the electron beam for a predetermined period of time in such a manner that the each of the irradiation areas is filled with the shot of the electron beam.

3. The three-dimensional laminating and shaping apparatus as set forth in claim 2, wherein
   while the position irradiated with the electron beam is moved within the irradiation area, the melting judging unit outputs the melting signal when a range of variation in the strength of the detection signal detected by the electron detector falls below a predetermined range.

4. The three-dimensional laminating and shaping apparatus as set forth in claim 2, wherein
   a plurality of the electron detectors are positioned in different directions relative to the position irradiated with the electron beam, and
   the melting judging unit outputs the melting signal when a difference in strength between detection signals from different ones of the electron detectors falls below a predetermined range.

5. The three-dimensional laminating and shaping apparatus as set forth in claim 3, wherein
   the deflection controller controls the irradiation with the electron beam for the irradiation area to be continued until receiving the melting signal.

6. The three-dimensional laminating and shaping apparatus as set forth in claim 4, wherein
the deflection controller controls the irradiation with the electron beam for the irradiation area to be continued until receiving the melting signal.

7. The three-dimensional laminating and shaping apparatus as set forth in claim 1, wherein
a size of a shot of the electron beam is equal to or smaller than a size of a particle of a powder of a source material used to make the powder layer.

8. The three-dimensional laminating and shaping apparatus as set forth in claim 2, wherein
a size of a shot of the electron beam is equal to or smaller than a size of a particle of a powder of a source material used to make the powder layer.

9. The three-dimensional laminating and shaping apparatus as set forth in claim 3, wherein
a size of a shot of the electron beam is equal to or smaller than a size of a particle of a powder of a source material used to make the powder layer.

10. The three-dimensional laminating and shaping apparatus as set forth in claim 4, wherein
a size of a shot of the electron beam is equal to or smaller than a size of a particle of a powder of a source material used to make the powder layer.

11. The three-dimensional laminating and shaping apparatus as set forth in claim 5, wherein
a size of a shot of the electron beam is equal to or smaller than a size of a particle of a powder of a source material used to make the powder layer.

12. The three-dimensional laminating and shaping apparatus as set forth in claim 6, wherein
a size of a shot of the electron beam is equal to or smaller than a size of a particle of a powder of a source material used to make the powder layer.

13. A laminating and shaping method for a three-dimensional structure, performed by a three-dimensional laminating and shaping apparatus including a powder feeding unit configured to feed a powder layer, an electron beam column configured to output an electron beam and deflect the electron beam toward a front surface of the powder layer, an electron detector configured to detect an electron emitted from the front surface of the powder layer as a result of irradiation with the electron beam, a melting judging unit configured to detect that the powder layer is melted based on a range of variation over time of a strength of a detection signal from the electron detector and generate a melting signal based on a reduced level of the range in variation over time of the strength of the detection signal from the electron detector, and a deflection controller configured to receive the melting signal and determine a condition of the irradiation with the electron beam, the laminating and shaping method comprising:
by the powder feeding unit, feeding the powder layer;
by the electron beam column, irradiating the powder layer with the electron beam;
by the electron detector, detecting an amount of electrons emitted from the front surface of the powder layer;
by the melting judging unit, generating the melting signal when a range of variation over time in the strength of the detection signal from the electron detector becomes less than or equal to a predetermined reference value; and
by the deflection controller, setting the condition of the irradiation based on the melting signal.

14. A laminating and shaping method for a three-dimensional structure, performed by a three-dimensional laminating and shaping apparatus including a powder feeding unit configured to feed a powder layer, an electron beam column configured to output an electron beam and deflect the electron beam toward a front surface of the powder layer, a plurality of electron detectors each configured to detect an electron emitted from the front surface of the powder layer as a result of irradiation with the electron beam, a melting judging unit configured to detect that the powder layer is melted based on a difference in variation over time of strength of detection signals from respective ones of the plurality of electron detectors and generate a melting signal, and a deflection controller configured to receive the melting signal and determine a condition of the irradiation with the electron beam, the laminating and shaping method comprising:
by the powder feeding unit, feeding the powder layer;
by the electron beam column, irradiating the powder layer with the electron beam;
by the electron detectors, detecting an amount of electrons emitted from the front surface of the powder layer;
by the melting judging unit, generating the melting signal when a difference in variation of strength between the detection signals from different ones of the plurality of electron detectors becomes equal to or less than a predetermined reference value; and
by the deflection controller, setting the condition of the irradiation based on the melting signal.

* * * * *